(12) United States Patent
Sissmann et al.

(10) Patent No.: US 11,028,310 B2
(45) Date of Patent: Jun. 8, 2021

(54) METHOD FOR TREATING THE AREA SURROUNDING A WELL USING AN AQUEOUS GELLING SOLUTION COMPRISING AN ALKALINE POTASSIUM SILICATE SOLUTION AND AN ACETIC ACID

(71) Applicant: IFP Energies nouvelles, Rueil-Malmaison (FR)

(72) Inventors: Olivier Sissmann, Paris (FR); Marc Fleury, La Celle Saint Cloud (FR); Michel Chardin, Colombes (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 234 days.

(21) Appl. No.: 16/090,858

(22) PCT Filed: Feb. 15, 2017

(86) PCT No.: PCT/EP2017/053372
§ 371 (c)(1),
(2) Date: Oct. 3, 2018

(87) PCT Pub. No.: WO2017/174243
PCT Pub. Date: Oct. 12, 2017

(65) Prior Publication Data
US 2020/0325382 A1    Oct. 15, 2020

(30) Foreign Application Priority Data

Apr. 4, 2016 (FR) .................................... 16/52.923

(51) Int. Cl.
*E21B 33/138* (2006.01)
*C09K 8/42* (2006.01)
*C09K 8/44* (2006.01)

(52) U.S. Cl.
CPC .............. *C09K 8/426* (2013.01); *C09K 8/44* (2013.01); *E21B 33/138* (2013.01)

(58) Field of Classification Search
None
See application file for complete search history.

(56) References Cited

U.S. PATENT DOCUMENTS

| 4,215,001 A | * | 7/1980 | Elphingstone ......... C09K 8/665 507/277 |
| 4,438,976 A | | 3/1984 | Baughman et al. |
| 5,067,416 A | | 11/1991 | Delmas et al. |

(Continued)

FOREIGN PATENT DOCUMENTS

WO    2014/190226 A1    11/2014

OTHER PUBLICATIONS

International Search Report for PCT/EP2017/053372, dated Apr. 6, 2017; English translation submitted herewith (5 pgs.).

*Primary Examiner* — Andrew Sue-Ako
(74) *Attorney, Agent, or Firm* — Fitch, Even, Tabin & Flannery, L.L.P.

(57) ABSTRACT

The present invention relates to a process for the treatment of the area (10) surrounding a well (1) in which an aqueous gelling solution comprising an alkaline potassium silicate solution and an acetic acid is prepared and then injected into a subterranean formation. This aqueous gelling solution makes it possible, by virtue of these gelling properties, to block the area (10) surrounding the well (1).

15 Claims, 2 Drawing Sheets

(56) References Cited

U.S. PATENT DOCUMENTS

2008/0028995 A1* 2/2008 Barlet-Gouedard ... C09K 8/467
 106/811
2014/0352967 A1* 12/2014 Burns ................... C09K 8/512
 166/305.1

* cited by examiner

METHOD FOR TREATING THE AREA SURROUNDING A WELL USING AN AQUEOUS GELLING SOLUTION COMPRISING AN ALKALINE POTASSIUM SILICATE SOLUTION AND AN ACETIC ACID

CROSS-REFERENCE TO RELATED APPLICATIONS

This application is a U.S. national phase application filed under 35 U.S.C. § 371 of International Application No. PCT/EP2017/053372, filed Feb. 15, 2017, designating the United States, which claims priority from French Patent Application No. 16/52.923, filed Apr. 4, 2016, which are hereby incorporated herein by reference in their entirety.

The present invention relates to the field of the treatment of the area surrounding a well within a subterranean formation, in particular for a well for the geological storage of acid gases, for example carbon dioxide $CO_2$. In particular, the invention relates to the closing of wells giving access to geological formations in which the storage takes place by injection. One of the objectives is to prevent leakages, in particular of acid gases, for example of $CO_2$, via the well or its vicinity.

Procedures for the shutdown of wells are known in which plugs of different qualities are introduced into the casings of the well: mechanical plugs made of expandable material, cement plugs, resin plugs. However, the durability of these materials, and also that of the casing pipe subjected to corrosion, are not sufficient in the case of the storage of acid gases, in particular of $CO_2$.

Injections under pressure (squeeze) of specific blocking products via the perforations of the well, in order to seal off the porous and permeable formation, are also known. However, it is known that it is difficult to control the placing of these injected products, which renders the efficiency of the blocking uncertain.

In addition, the patent application WO 2010/0107219 A1, which describes a method for the treatment of the area surrounding a well for the storage of acid gas, is known. For this method, a flushing fluid and then a reactive solution suitable for reacting with acid gases are injected into the rock, this reactive solution comprising basic oxides. However, this method provides for the use of materials which may be expensive, which may pollute the subterranean formation and which may require a specific preparation in order in particular to regulate the viscosity.

In order to overcome these disadvantages, the present invention relates to a process for the treatment of the area surrounding a well in which an aqueous gelling solution comprising an alkaline potassium silicate solution and an acetic acid is prepared and then injected into a subterranean formation. This aqueous gelling solution makes it possible, by virtue of these gelling properties, to block the area surrounding the well, while being not very expensive and not very polluting.

THE PROCESS ACCORDING TO THE INVENTION

The invention relates to a process for the treatment of the area surrounding a well within a subterranean formation. For this process, the following stages are carried out:

a) an aqueous gelling solution comprising an alkaline potassium silicate solution and an acetic acid is prepared; and b) said aqueous gelling solution is injected, from said well into said subterranean formation, in order to treat, within said subterranean formation, the area surrounding said well.

According to one embodiment of the invention, said aqueous gelling solution is prepared as a function of characteristics of said subterranean formation, such as the porosity, the permeability and/or the surrounding pH.

Advantageously, an aqueous gelling solution having a viscosity of between 1 and 10 cP is prepared.

Preferably, an aqueous gelling solution having a setting time of between 3 and 20 hours is prepared.

In accordance with one implementation, said acetic acid has a concentration of between 0.1 and 5 mol/l, preferably between 0.5 and 2 mol/l.

According to an alternative embodiment, said alkaline potassium silicate solution comprises a concentration of silicon Si of 0.5 to 7 mol/l, preferably of 0.5 to 3 mol/l.

According to one characteristic, said alkaline potassium silicate solution comprises a molar ratio of silicon dioxide $SiO_2$ with respect to the potassium oxide $K_2O$ of between 0.5 and 10, preferably between 1 and 5.

In accordance with one aspect, said aqueous gelling solution comprises between 1% and 30% by weight of acetic acid, preferably between 5% and 30%.

Advantageously, a flushing fluid is injected, from said well, into said subterranean formation prior to the injection of said aqueous gelling solution.

In accordance with one conception, said well is a well for the extraction of hydrocarbons from said subterranean formation, a hydraulic fracturing well or a storage well, in particular a well for the storage of acid gas in said subterranean formation.

In accordance with one embodiment, said acid gas is stored prior to the stage of injection of said aqueous gelling solution.

Alternatively, a perforation and/or at least one fracture obtained by fracturing, in particular by hydraulic fracturing, is blocked.

In addition, it is possible to plug said well after the stage of injection of said aqueous gelling solution.

According to one implementation, said subterranean formation comprises a surrounding pH of less than 9.

BRIEF PRESENTATION OF THE FIGURES

Other characteristics and advantages of the process according to the invention will become apparent on reading the description below of nonlimiting implementational examples, with reference to the appended figures described below.

DETAILED DESCRIPTION OF THE INVENTION

Figure 1:
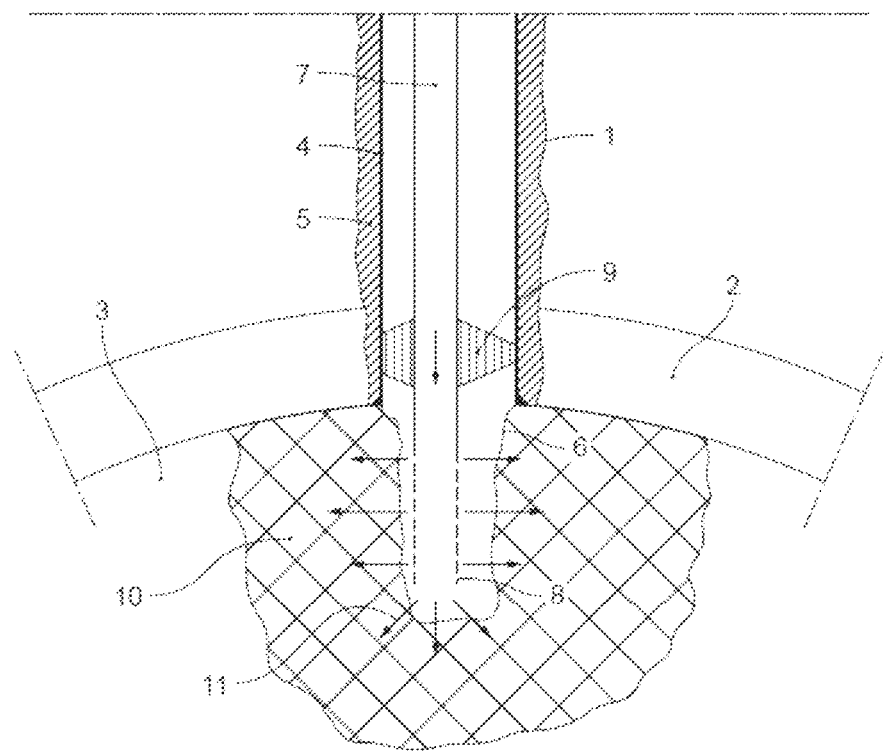
FIG. 1 illustrates the process according to a first embodiment of the invention.

The principle of the invention is based on the insertion, in the area surrounding a well, that is to say in the vicinity of the well (in other words, within a radius of a few meters around the well), the well giving access between the surface of the ground and the subterranean formation, of a solution which makes it possible to greatly limit the permeability of the rock of the reservoir, and even to block it, in said vicinity of the well. Thus, the injected solution makes it possible to limit, indeed even to prevent, leakages of fluids through the well and makes it possible to form a protective layer for the well equipment with regard to fluids, in particular possible stored acid gases. The leakages can be leakages of gas, in particular of acid gases, leakages of radioactive materials, and the like.

The present invention thus relates to a process for the treatment of the area surrounding wells within a subterranean formation, for which the following stages are carried out:

an aqueous gelling solution comprising an alkaline potassium silicate solution and an acetic acid is prepared, at the surface, the aqueous gelling solution is injected, from the well into the subterranean formation, in order to treat, within the subterranean formation, the area surrounding the well.

The process according to the invention can comprise several successive stages, for example two, of injection of the aqueous gelling solution.

Such an aqueous gelling solution is stable and unchanging, in particular when the surrounding pH (of the subterranean formation) is less than 9. This is why the process according to the invention can preferably be carried out for a subterranean formation having a pH of less than 9, which is generally the case.

The term "gelling" indicates that the aqueous solution is formulated in the form of a nongelled and not very viscous liquid, which completes its gelling once injected into the subterranean formation. The composition of the aqueous gelling solution is thus chosen so as to form a gel, starting from a long sufficient time to make possible the transportation of the liquid from the surface toward the subterranean formation. Thus, by virtue of its gelling property, the aqueous solution can perform its role of limiting the permeability and the porosity of the subterranean formation.

An alkaline solution is a basic solution which has a pH of greater than 7.

It should be remembered that silica is very soluble in alkaline solutions, in particular in alkaline solutions with a pH of approximately 10 and greater than 10. Furthermore, a fall in pH brings about the precipitation of the silica present in the alkaline solution: starting from a liquid phase in which the silica is in an ionic form, oligomers are created and then condense to form a gel. The gel has a tendency to become attached to inorganic surfaces with the formation of chemical bonds. Thus, in a porous formation, the injection of such substances makes it possible to considerably reduce the permeability and the porosity, indeed even to completely seal off the porous network, after precipitation. In addition, the inorganic substances precipitated by the aqueous gelling solution also form a protective layer for the well equipment with regard to the stored acid gases.

There exist different forms of silicate: sodium silicate, potassium silicate, lithium silicate, and the like. Potassium silicate is a water-soluble silicate, of general formula $K_2O_5Si_2$. This silicate exhibits the advantage of rendering the alkaline solution less viscous than sodium Na silicate in particular. Thus, potassium silicate requires a reduced dilution, which simplifies the preparation of the aqueous gelling solution. Furthermore, given that alkaline silicate solutions do not contain particles, there are virtually no limits on injectivity with respect to the size of the pores of the porous medium of the subterranean formation. In particular, it is possible to envisage the injection of such a solution into compact media exhibiting nanometric pore thresholds, thus further improving their barrier capability. In addition, the alkaline potassium silicate solution exhibits the advantage of being relatively inexpensive, of the order of a few hundred euros per tonne. For example, the potassium silicate can be chosen from the commercial products Betol K 35 T®, Betol K 48 T®, Betol K 54 T® or Betol K 28 T® sold by Woellner® (Germany). As nonlimiting examples, the compositions of the potassium silicates Betol K 35 T® and Betol K 28 T® are described in table 1. In this table, the density, which is unitless, corresponds to the volumetric mass density with respect to that of water.

TABLE 1

Compositions of the potassium silicates

| Product | $SiO_2$ % | $K_2O$ % | $SiO_2/K_2O$ | Viscosity (cP) | Density | pH |
| --- | --- | --- | --- | --- | --- | --- |
| Betol K 35 T® | 23.9 | 10.9 | 3.43 | 55 | 1.32 | 11 |
| Betol K 28 T® | 20.5 | 8.2 | 3.92 | 28 | 1.25 | 10.8 |

Acetic acid, also known as ethanoic acid, is a simple carboxylic acid with a theoretical $C_2$ carbon chain, analogous to ethane, with a molar mass of 60 g/mol and with the molecular chemical formula $C_2H_4O_2$ or expanded chemical formula $CH_3COOH$. Vinegar is an example of acetic acid solution: it can be a mixture of water and acetic acid. Acetic acid exhibits the advantage, contrary to other acids, of not being polluting or dangerous, whether during its preparation or injected into the subterranean formation.

According to one embodiment of the invention, the composition of the aqueous gelling solution is determined essentially as a function of the temperature of the subterranean formation. For example, during the preparation, it is possible to modify the proportions of water and of acid in order to adjust the gelling time, while remaining not very viscous. This is because the usual main constraints for the injection of solutions into a subterranean formation are as follows:

a moderate viscosity, so that the injection pressures lie well below the pressures for fracturing the formation; advantageously, the viscosity of the aqueous gelling solution can be between 1 and 10 cP, and a setting time, also known as gelling time (that is to say, the time necessary between the preparation of the solution and its gelling), which is sufficient to make possible the injection of the solution when it is prepared at the surface and then injected into the formation; advantageously, the setting time can be between 3 and 20 hours.

According to one implementation of the invention, the acetic acid can have a concentration of between 0.1 and 5 mol/l, preferably between 0.5 and 2 mol/l. This concentration range makes it possible in particular to prepare the gelling solution without risk of generating aggregates and a nonhomogeneous solution. For example, the acetic acid can have a concentration substantially equal to 1 mol/l, that is to say a concentration substantially identical to that of a vinegar. It is the concentration of pure acid in the gelling solution which makes it possible to regulate the gelling time. Thus, the initial silicate solution can be diluted with a greater amount of water if a more concentrated acid is used.

In accordance with one embodiment of the invention, the alkaline potassium silicate solution can comprise a concentration of silicon Si of 0.5 to 7 mol/l, preferably of 0.5 to 3 mol/l. This concentration range makes it possible in particular to obtain stable irreversible gels. For example, the commercial alkaline potassium silicate solution can comprise a concentration of silicon of between 4 and 5 mol/l, substantially equal to 4.7 mol/l. It can then be diluted with water to achieve a concentration of between 0.5 and 3 mol/l, substantially equal to 1.8 mol/l. This dilution also reduces the viscosity of the solution toward values akin to that of pure water.

According to one characteristic of the invention, the alkaline potassium silicate solution can comprise a molar ratio ($SiO_2/K_2O$) of silicon dioxide $SiO_2$ with respect to the potassium oxide $K_2O$ of between 0.5 and 10, preferably between 1 and 5. For example, the alkaline potassium silicate solution can comprise a molar ratio of silicon dioxide $SiO_2$ with respect to the potassium oxide $K_2O$ which is substantially equal to 4.

In accordance with an alternative embodiment of the invention, the aqueous gelling solution can comprise between 1% and 30% by weight of acetic acid, preferably between 10% and 20% by weight of acetic acid. Thus, it is possible to regulate the pH of the aqueous gelling solution. For example, the aqueous gelling solution can comprise substantially 16% by weight of acetic acid.

When this is of use, and in particular when the temperature of the targeted formation is high, it is possible to further increase the gelling time by using another weak acid, such as boric acid, or also by using aqueous solutions concentrated in certain metal cations, such as an aluminum hydroxide solution. Generally, these metal ions will partially replace the silicon in the structure of the silica tetrahedron in order to slow down the polymerization and condensation mechanisms, increasing the gelling times. The aqueous gelling solution can comprise any other compound which makes it possible in particular to adjust it to the subterranean formation.

In order to block a porous formation around a well, it is possible to operate in the following way:
- an aqueous gelling solution is prepared, at the surface, from an alkaline potassium silicate solution, water and acetic acid. Preferably, these mixtures are produced gradually in order to prevent a local precipitation due to a localized excessive concentration. Such gradual mixing devices are commonly available, for example for the preparation of gels from polymers. At surface temperatures lower than the temperature anticipated in the subterranean formation (for example 20° C., in comparison with 40° C.), the gelling kinetics are greatly slowed down, increasing in proportion the time available for preparing the mixtures,
- the gelling mixture (the aqueous gelling solution) is injected into the formation, in particular by conventional pumping means; upstream of the volume injected (fluid present in the well), it is possible to use water without causing precipitation. Downstream of the injected volume, it is possible, in an identical way, to use water.

An order of magnitude of the gelling time of the aqueous gelling solution at 40° C. can be approximately 500 min, i.e. 8.5 h. This order of magnitude is sufficient to make it possible to place the aqueous gelling solution in the porous formation before gelling. For example, for a pore volume of approximately 10 $m^{-3}$ within a radius of 1 m around a well and over a height of 10 m with a porosity of 30%—using a typical pumping rate of 10 $m^3/h$, the injection time necessary for the aqueous gelling solution is 1 hour. It is necessary to add, to this, the time for displacement of the solution into the well, which can last approximately 3 hours depending on the technique employed and the diameter of the injection pipe.

In order to flush, within the subterranean formation, the area surrounding the well, the process can comprise a stage of injection of a flushing fluid, in particular water, prior to the injection of the aqueous gelling solution. Furthermore, the flushing fluid can contain viscosifying additives for improving the flushing.

In the case of a well for the storage of acid gases, the volume of the flushing fluid injected is preferably sufficient to drive the acid gas back to a radial distance of at least a few meters from the area surrounding the well. This rinsing, preferably with water, subsequently ensures a good injectivity of the formation comprising the reactive material in the area surrounding the well. In the absence of rinsing, the method might be less effective as there is a risk of rapidly forming superficial inorganic compounds (carbonates and/or sulfides) resulting locally in a plugging of the porosity which would limit the invasion of the area surrounding the well by the reactive formulation.

The process can additionally comprise a stage of well plugging after injection of the aqueous gelling solution.

For example, the operation can be terminated by the injection of a cement plug, or any other blocking formulation, in order to keep the reactive material in place. On completion of this first operation, it is possible to carry out the same operation in other zones, in particular in the roof of the reservoir, after perforation of the casing and the primary cementing, so as to make possible the injection.

The process according to the invention can be applied to a well for the storage of acid gases in the subterranean formation. It can also be applied to an exploitation or exploration well of a subterranean formation comprising hydrocarbons. It can also be applied to a well used for the recovery of hydrocarbons by fracturing, in particular by hydraulic fracturing. In this case, the aqueous gelling solution makes it possible to block the perforation and/or the fractures formed for the process. Alternatively, it can be applied to any type of storage in a subterranean formation, for example for the storage of radioactive materials. For all the applications, the process according to the invention makes it possible in particular to limit leakages of gas through the well.

The invention applies firstly to the closing of an injector well which it has been decided to no longer use, which can be compared to the shutdown of an oil well. However, the invention can also be employed during the construction of a well specifically drilled for the geological storage of acid gases, which takes place in reservoir rocks, aquifers or coal seams.

Figure 2:
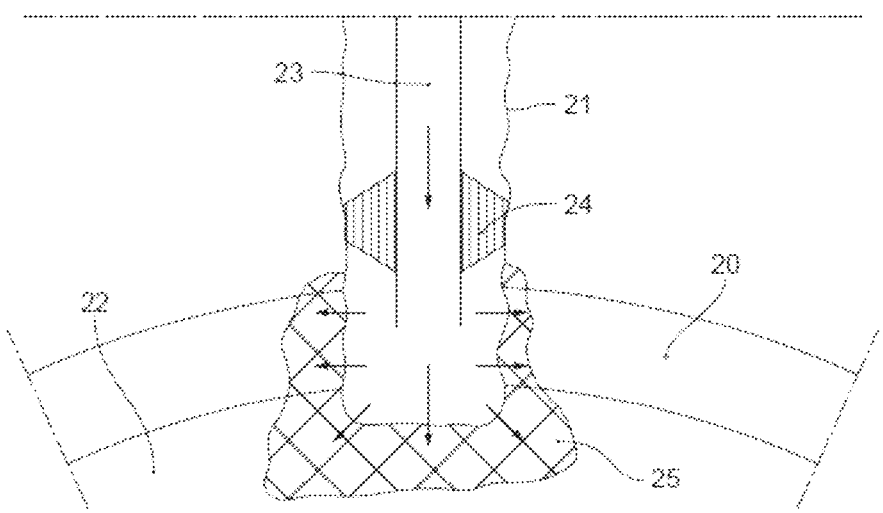
FIG. 2 illustrates the process according to a second embodiment of the invention.

FIGS. 1 and 2 illustrate the process according to the invention, in the case of the injection of acid gases into a subterranean formation. However, the other applications envisaged are carried out substantially identically.

FIG. 1 shows a borehole 1 produced through the cap rock 2 which overlies the reservoir rock 3. A casing is produced in the borehole 1 by a pipe 4 cemented in the drilled hole 1 by a cementing material 5. Access to the reservoir is obtained via a drilled drain hole 6. An injection pipe 7 ending in a liner 8 is lowered down the well and the annular space between said injection pipe and the casing 4 is sealed off by sealing elements of packer type 9, or equivalents, well known in the profession.

The diagram of FIG. 1 shows an example of well equipment, which is in no way limiting; other alternative forms are applicable to the present invention, in particular completions or well equipment, for horizontal wells.

The injection of acid gas is carried out via the pipe 7. Once the filling of the reservoir is complete, a flushing can be carried out in order to drive the carbon dioxide $CO_2$ or the hydrogen sulfide $H_2S$ back from the zone 10 which it is desired to treat. Preferably, water is used but other fluids can be used for this flushing insofar as they carry out the functions equivalent to those of water. For example, viscosifying additives can be added in order to improve the flushing.

After the flushing, an aqueous gelling solution is then injected in the area surrounding the well and within a radius of a few meters. The arrows 11 diagrammatically represent said injection.

When the acid gas has a tendency to return toward the well, these bases react with the acid gas originating from the storage and will render the latter inorganic in the pores of the porous media in the area surrounding the well, in the form of carbonates or hydrogencarbonates, in the case of $CO_2$, and in the form of sulfides, in the case of $H_2S$, in this way reducing the porosity and the permeability of the area surrounding the well and thus decreasing the potential leakage rate of acid gas toward the surface by passing through the well. The inorganic substances precipitated also form a protective layer for the well equipment with regard to the stored acid gases.

The invention also applies during the drilling of a new well for the purpose of injecting therein acid gases to be stored. In this case, once the cap rock of the reservoir has been reached and the borehole has passed through it, the method described above is then applied. FIG. 2 shows a borehole 21 which has reached the cap rock 20 overlying the storage reservoir 22. A flushing with water is carried out, followed by the injection, immediately below the level of the cap (in the roof of the reservoir), of a gelling formulation. Use is made, for this, of a packing of pipes 23, and a packer for isolation of the annular space 24. The zone 25 is thus invaded by a reactive material which can react, in the event of leakage of acid gas, in said zone. The drilling with the drilling fluid is continued down to the desired depth, then the insertion of the casing and the cementing are carried out, and then the perforations necessary for the subsequent injection of the acid gas(es) are produced. This preventive method, carried out upstream of the injection of $CO_2$, makes it possible to limit the risks of leakages at the cap, the place where the plume of $CO_2$ might accumulate during and after the injection, by greatly reducing the permeability of the reservoir rock immediately below the clayey cap. During the closing for shutdown of this well, the procedure described above is carried out.

EXAMPLE

Figure 3:
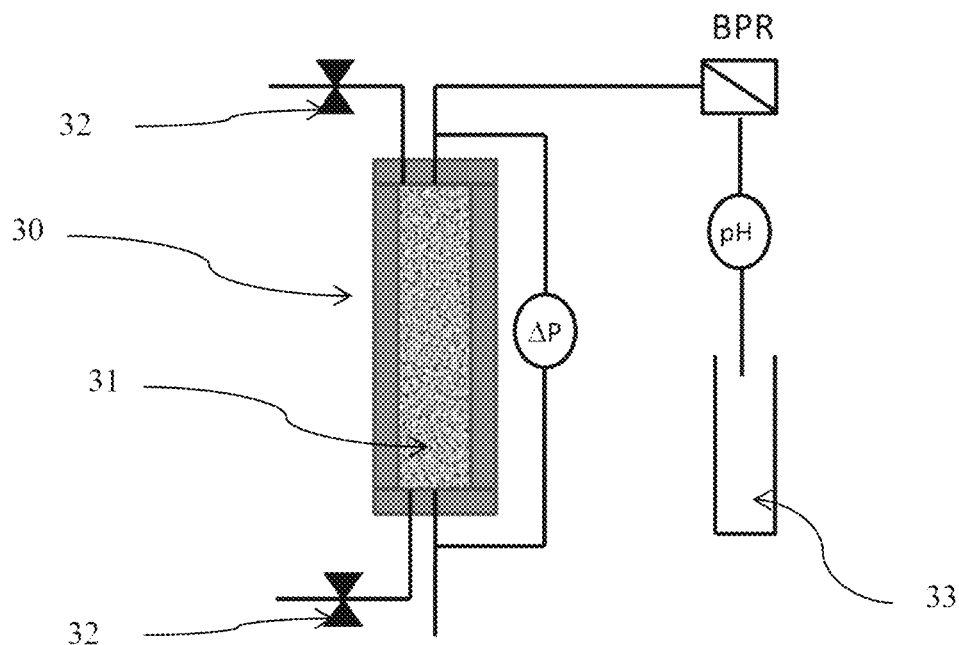
FIG. 3 illustrates a diagram of an experimental assembly for testing an aqueous gelling solution according to the invention.

The aqueous gelling solutions described above make it possible to block a porous medium. Tests have been carried out with a conventional device which makes it possible to measure the permeability of porous media (FIG. 3). The measurement device comprises a cell 30 comprising a sample 31 of the porous medium. The aqueous gelling solution is injected into the sample 31 via the line of then a tank 33, by means of a pressure-regulating valve BPR. The measurement device additionally comprises a means for measurement of difference in pressure ΔP between the inlet and the outlet of the cell 30, and a means for measurement of the pH of the aqueous gelling solution. Furthermore, the measurement device makes it possible in addition to rinse the connections and the front and rear injection faces by means of the purges 32. Thus, only the blocking in the porous medium is measured, and not the plugging of the connections.

The porous medium used is a sample representative of a gritty formation of good porosity (24.5%) and of moderate permeability (62 mD), but the test would be identical for any other medium. After having measured the permeability to water of the porous medium, the aqueous gelling solution (alkaline potassium silicate solution+water+acetic acid) is injected into the porous medium. The good saturation of the porous medium is confirmed by measuring, using the pH meter placed at the outlet, an identical pH value at the outlet with respect to the solution injected. The connections and the injection nozzles are then rinsed with fresh water and there is then a wait for the solution to gel, the assembly being placed at a stable regulated temperature in an oven (for example 40° C.).

For these tests, the aqueous gelling solution comprises:
an industrial alkaline potassium silicate solution (Betol K 28 T®, sold by Woellner® (Germany)) with a concentration of silicon [Si]=4.7 mol/l and a $SiO_2/K_2O$ molar ratio=3.92,
water, so that the alkaline potassium silicate solution is diluted with 50% by weight of water,
then, 15.7% by weight of acetic acid, with a concentration of 1 mol/l, is added to the solution.

Figure 4:
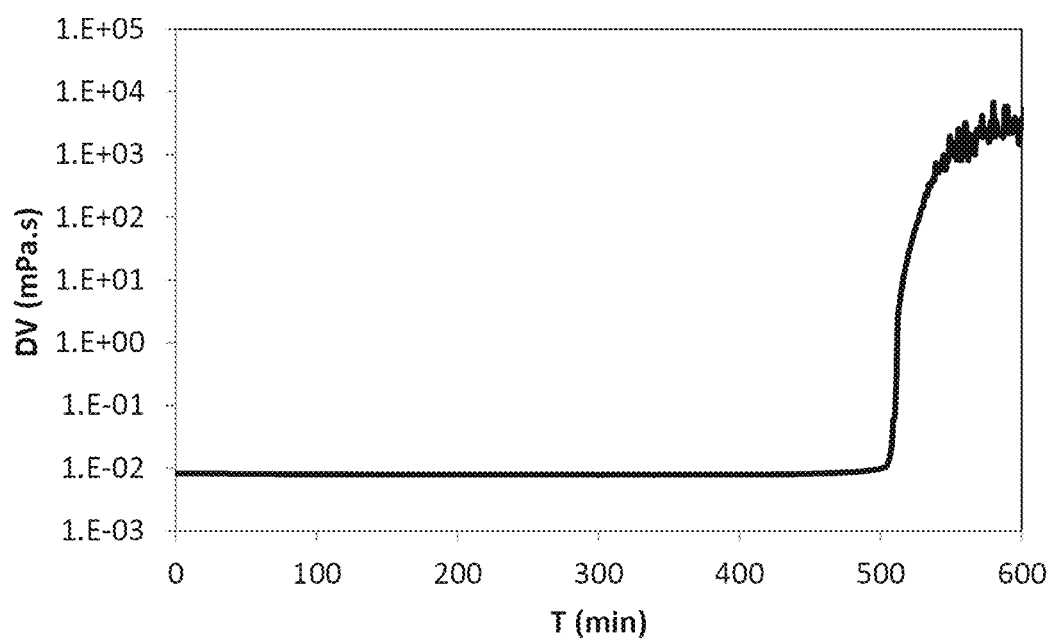
FIG. 4 illustrates, for an example according to the invention, the change in the dynamic viscosity as a function of the time.

FIG. 4 illustrates the change in the dynamic viscosity DV (in mPa·s) of this aqueous gelling solution as a function of the time T (in min). Thus, the gelling solution was placed in a conventional rheometer comprising a flat plate at regulated temperature (40° C.) and an oscillating cone placed above and oscillating with a low amplitude of approximately ten degrees, so as not to continuously shear the liquid, which might modify its behavior. The force necessary to carry out this oscillation is then measured and it is possible to thus deduce the viscosity therefrom. When the solution gels, the oscillation is greatly reduced, which makes it possible to determine the gelling time. For this solution, it is observed that the viscosity remains identical for 500 minutes and then suddenly increases, which corresponds to the gelling of the solution. Visually and at 40° C. also, the solution remains clear and transparent immediately after mixing. Then, gradually, the solution becomes translucent, while remaining fluid. After 40 h, the gel formed no longer flows when the container (in which the mixture was initially placed) is inverted.

By using, in the measurement device, this formulation of the aqueous gelling solution with a proportion of acetic acid of 15.7% and after waiting for 90 h, the injection pressure necessary in order to obtain breakdown of the gel is 19.5 bar for 3 cm of core. Thus, the blocking can be estimated at approximately 600 bar/m. Below this pressure, the water cannot pass through the porous medium. Similar tests have shown that, in the presence of an acid gas, such as $CO_2$, the same blocking pressures are obtained. Once the gel has been broken down by applying a pressure of greater than 19.5 bar in the present case, a permeability of 6 mD is measured, whereas the initial permeability of the porous medium was 62 mD, i.e. a decrease by a factor of ten. This shows that, after breakdown, the porous network is permanently modified. In order to further increase the breakdown pressure and/or further decrease the permeability, a second injection can be carried out.

The invention claimed is:

1. A process for the treatment of the area surrounding a well within a subterranean formation, the well being for storage of acid gas in the subterranean formation, the process comprising:
   preparing an aqueous gelling solution comprising an alkaline potassium silicate solution and an acetic acid; and
   injecting the aqueous gelling solution from the well into the subterranean formation, in order to treat, within the subterranean formation, the area surrounding the well,
   wherein the acid gas is stored in the subterranean formation prior to injecting the aqueous gelling solution.

2. The process as claimed in claim 1, wherein preparing the aqueous gelling solution further comprises measuring one or more of porosity, permeability and surrounding pH of the subterranean formation.

3. The process as claimed in claim 1, wherein the prepared aqueous gelling solution has a viscosity of between 1 and 10 pct.

4. The process as claimed in claim 1, wherein the prepared aqueous gelling solution has a setting time of between 3 and 20 hours.

5. The process as claimed in claim 1, wherein the acetic acid has a concentration of between 0.1 and 5 mol/l.

6. The process as claimed in claim 1, wherein the alkaline potassium silicate solution comprises a concentration of silicon Si of 0.5 to 7 mol/l.

7. The process as claimed in claim 1, in which the alkaline potassium silicate solution comprises a molar ratio of silicon dioxide $SiO_2$ with respect to the potassium oxide $K_2O$ of between 0.5 and 10.

8. The process as claimed in claim 1, wherein the aqueous gelling solution comprises between 1% and 30% by weight of acetic acid.

9. The process as claimed in claim 1, further comprising injecting a flushing fluid from the well into the subterranean formation prior to injecting the aqueous gelling solution.

10. The process as claimed in claim 1, further comprising plugging the well after injecting the aqueous gelling solution.

11. The process as claimed in claim 1, wherein the acetic acid has a concentration of between 0.5 and 2 mol/l.

12. The process as claimed in claim 1, wherein the alkaline potassium silicate solution comprises a concentration of silicon Si of 0.5 to 3 mol/l.

13. The process as claimed in claim 1, in which the alkaline potassium silicate solution comprises a molar ratio of silicon dioxide $SiO_2$ with respect to the potassium oxide $K_2O$ of between 1 and 5.

14. The process as claimed in claim 1, wherein the aqueous gelling solution comprises between 5% and 30% by weight of acetic acid.

15. A process for treatment of an area surrounding a well in a subterranean formation that stores acid gas, the process comprising:
   preparing an aqueous gelling solution by combining components comprising an alkaline potassium silicate solution and acetic acid; and
   injecting the aqueous gelling solution through the well and into the subterranean formation that stores the acid gas, the aqueous gelling solution treating the area surrounding the well in the subterranean formation.

* * * * *